United States Patent [19]

Beresniewicz et al.

[11] 4,043,961

[45] Aug. 23, 1977

[54] VINYL ACETATE-ETHYLENE COPOLYMER EMULSIONS HAVING IMPROVED WATER RESISTANCE

[75] Inventors: Aleksander Beresniewicz, Wilmington; Harold Kirkwood Inskip, Newark, both of Del.

[73] Assignee: E. I. Du Pont de Nemours and Company, Wilmington, Del.

[21] Appl. No.: 653,518

[22] Filed: Jan. 29, 1976

[51] Int. Cl.$^2$ ............................................. C08L 31/04
[52] U.S. Cl. .................. 260/29.6 WA; 260/29.6 RW; 260/29.6 B; 428/500
[58] Field of Search ............ 260/29.6 WA, 29.6 RW, 260/29.6 B; 526/7, 8

[56] References Cited

U.S. PATENT DOCUMENTS

| | | | |
|---|---|---|---|
| 2,234,829 | 3/1941 | Neher et al. | 526/8 |
| 3,355,322 | 11/1967 | Worrall et al. | 260/29.6 WA |
| 3,689,469 | 9/1972 | Inskip et al. | 526/8 |
| 3,708,388 | 1/1973 | Lindemann et al. | 260/29.6 WA |

*Primary Examiner*—M. J. Welsh

[57] ABSTRACT

Adhesive compositions consisting essentially of an aqueous emulsion of vinyl acetate-ethylene copolymer prepared in the presence of protective colloid comprising fully hydrolyzed vinyl alcohol copolymer containing methyl methacrylate have improved water resistance.

7 Claims, No Drawings

VINYL ACETATE-ETHYLENE COPOLYMER EMULSIONS HAVING IMPROVED WATER RESISTANCE

BACKGROUND OF THE INVENTION

1. Field of the Invention

This invention relates to adhesive compositions, and more particularly, it relates to the use of fully hydrolyzed vinyl alcohol copolymer as protective colloid in vinyl acetate-ethylene copolymer aqueous emulsions.

2. Description of the Prior Art

It has long been the object of research to provide stable vinyl acetate copolymer emulsions capable of yielding adhesive bonds which exhibit optimum water resistance and high strength. U.S. Pat. No. 3,563,851 discloses that one of the more frequently used modifiers for vinyl acetate homo- or copolymer emulsions is polyvinyl alcohol which aids in increasing the viscosity and improving the machineability and moistenability of the adhesive. However, it is taught therein that such emulsions containing polyvinyl alcohol are inherently poor with respect to their water resistance. According to this patent the addition of certain acidic, metal salt curing agents to the aqueous emulsions of copolymers of vinyl acetate, which emulsions also contain polyvinyl alcohol as a protective colloid, yields adhesive bonds with outstanding water resistance. The vinyl acetate copolymers dealt with in this patent are those of alkyl esters of acrylic and methacrylic acid, substituted or unsubstituted mono- or dialkyl esters of alpha,beta-unsaturated dicarboxylic acid, alpha,beta-unsaturated carboxylic acid, vinyl halides, vinylidene halides, and amides of alpha,beta-unsaturated carboxylic acids.

U.S. Pat. No. 3,708,388 discloses adhesive compositions consisting of aqueous vinyl acetate-ethylene copolymer emulsions containing about 5 to 40 percent by weight ethylene and a solids content of about 45 to 60 percent wherein the vinyl acetate and ethylene monomers are copolymerized in the presence of a polyvinyl alcohol, hydroxyethyl cellulose, casein, hydroxyethyl starch, carboxymethyl cellulose, gum arabic, etc. protective colloid. The use of polyvinyl alcohol acetylated up to 50 percent is disclosed and specific examples using a combination of two polyvinyl alcohols, each of which has a degree of hydrolysis of 87-89 mole percent, was given. This patent does not contain any teaching concerning the use of any special grade of polyvinyl alcohol in order to obtain improved water resistance. In teaching the suitability of a long list of protective colloids, they are presented as equivalents.

U.S. Pat. No. 3,827,996 discloses vinyl ester polymer dispersions which have good stability, water resistance, and viscosity index obtained by copolymerizing vinyl ester and ethylene in an aqueous medium in the presence of partially hydrolyzed polyvinyl alcohol having an average vinyl acetate content of about 5 to 7 mole percent consisting essentially of polylvinyl alcohol molecules containing no less than about 0.5 mole percent nor more than about 16 mole percent vinyl acetate. This patent does not disclose the use of vinyl alcohol/methyl methacrylate copolymers nor does it suggest that good water resistance could be obtained thereby.

U.S. Pat. No. 3,906,135 discloses an adhesive composition that, when cured, provides a bond having excellent water resistance. According to the disclosure vinyl acetate polymer/polyvinyl alcohol aqueous emulsion adhesives can yield cured bonds with substantially improved water resistance by including in the adhesive a monocarboxylic acid which can esterify polyvinyl alcohol. Curing of the adhesive composition is recommended at 225° F. to 375° F. The polyvinyl alcohol employed is 75 to 100 percent hydrolyzed.

U.S. Pat. No. 3,689,469 relates to copolymers of vinyl alcohol and methyl methacrylate having a residual vinyl acetate content of no more than 0.5 mole percent (i.e., at least 99.5 mole percent hydrolyzed) consisting of 94 to 98 percent vinyl alcohol and 6 to 2 percent by weight methyl methacrylate. The copolymer is disclosed to be useful where many commercial grades of polyvinyl alcohol are used. A particularly preferred use is as a textile yarn warp-sizing agent. There is no disclosure or even the faintest suggestion herein that the use of this vinyl alcohol copolymer as a protective colloid in the preparation of vinyl acetate-ethylene emulsions would result in an adhesive having excellent water resistance.

SUMMARY OF THE INVENTION

According to the present invention there is provided an aqueous emulsion which yields bonds having excellent water resistance, the emulsion consisting essentially of (a) from about 40 to about 60 percent by weight, preferably 50-55 percent, of vinyl acetate-ethylene copolymer having from about 70 to about 90 percent by weight of vinyl acetate and from about 10 to about 30 percent by weight of ethylene, (b) from about 2.5 to about 6.0 percent, based on the weight of the vinyl acetate-ethylene copolymer, of polyvinyl alcohol, at least about 20 percent by weight of the polyvinyl alcohol being an at least about 98.0 mole percent hydrolyzed vinyl alcohol copolymer having a methyl methacrylate content of from about 1 to about 10 percent by weight, the vinyl alcohol copolymer having a 4% aqueous solution viscosity at 20° C. of from about 5 to about 50 cps., preferably from about 20 to about 30 cps.

Further provided according to the present invention is a process for preparing an aqueous emulsion of vinyl acetate-ethylene which yields bonds having excellent water resistance, the process comprising copolymerizing in an aqueous medium from about 70 to about 90 percent by weight of vinyl acetate and from about 10 to about 30 percent by weight of ethylene in the presence of from about 2.5 to about 6.0 percent, based on the weight of the vinyl acetate-ethylene copolymer, of polyvinyl alcohol, at least about 20 percent by weight of the polyvinyl alcohol being an at least 98.0 mole percent hydrolyzed vinyl alcohol copolymer having a methyl methacrylate content of from about 1 to about 10 percent by weight, the vinyl alcohol copolymer having a 4% aqueous solution viscosity at 20° C. of from about 5 to about 50 cps.

Still further provided according to the present invention are laminates having an unexpectedly high water resistance comprising at least two sheets bonded together by means of the aqueous emulsion of the present invention.

DETAILED DESCRIPTION OF THE INVENTION

As used herein, the term "consisting essentially of" means that the named ingredients are essential; however, other ingredients which do not prevent the advantages of the invention from being realized can also be included. Thus, while the vinyl acetate-ethylene copolymer and the polyvinyl alcohol are recited as being essential ingredients, other ingredients commonly found in vinyl acetate-ethylene copolymer emulsions can also be included in the emulsions of the present invention. Among others, such ingredients include initiators and activators not consumed in the copolymerization process, buffers, preservatives, and fillers. Also, the present emulsions can contain water-soluble surfactants. However, with the exception of small amounts of nonionic surfactants, as discussed hereafter, the presence of surfactants is not ordinarily desirable, especially where a high degree of water resistance is required.

Surprisingly, it was found that the substitution of hot water soluble, non-gelling, fully hydrolyzed vinyl alcohol copolymer for part or all of the partially hydrolyzed polyvinyl alcohol heretofore employed as a protective colloid in the preparation of vinyl acetate-ethylene copolymer emulsions resulted in outstanding water resistance of the adhesive bond. It was found that when from about 20 to about 100 percent by weight, preferably from about 30 to about 45 percent, of the polyvinyl alcohol protective colloid consisted of vinyl alcohol copolymer in a vinyl acetate-ethylene copolymer emulsion containing a total of from about 2.5 to about 6.0 percent, preferably from about 3.1 to about 4.0 percent, based on the weight of the vinyl acetate-ethylene copolymer, of polyvinyl alcohol, the above referred to outstanding water resistance was obtained.

The special vinyl alcohol copolymers of the present invention are the bi- and terpolymers containing methyl methacrylate (MMA). These copolymers are prepared by copolymerizing vinyl acetate (VAc) and MMA and alcoholyzing the intermediate VAc/MMA copolymer by processes which are known in the art and are described and referred to in U.S. Pat. No. 3,689,469. As indicated in U.S. Pat. No. 3,689,469 at least a portion of the groups derived from MMA are converted to lactone groups during the alcoholysis of the precursor VAc/MMA copolymer. The methyl methacrylate comonomer content in the copolymer would range from about 1 to about 10 weight percent. Reducing the total comonomer content to less than about 1 weight percent would produce a bond which did not have the desired outstanding water resistance. Increasing the comonomer content beyond 6 weight percent of the vinyl alcohol copolymer does not result in further significant improvements in water resistance. Accordingly, the vinyl alcohol copolymers preferably contain from about 1.5 to about 6.0 weight percent total comonomer. Comonomers that can be used in addition to methyl methacrylate to form vinyl alcohol terpolymers are, e.g., ethyl methacrylate and butyl methacrylate.

The partially hydrolyzed polyvinyl alcohol, part or all of which is replaced by the vinyl alcohol copolymer according to the present invention, can be a from about 85 to about 95% hydrolyzed grade having a 4% aqueous solution viscosity at 20° C. of from about 5 to about 50 cps.

In the event that all of the partially hydrolyzed polyvinyl alcohol is replaced with fully hydrolyzed vinyl alcohol copolymer, i.e., when all of the protective colloid used in preparing the vinyl acetate-ethylene copolymer emulsion is a fully hydrolyzed vinyl alcohol copolymer, a surfactant should also be present to obtain good emulsion stability. Nonionic surfactants, such as Triton® X-100 (octyl phenoxy polyethoxy ethanol, manufactured by Rohm and Haas Company), are preferred. The use of anionic surfactants lowers the water resistance, and therefore this is not recommended generally.

Methods of preparing vinyl acetate-ethylene copolymer dispersions are well known and any of the customary techniques can be used; however, a preferred method is disclosed in U.S. Pat. No. Re. 28,065. Briefly the process is carried out by charging into a stirred pressure vessel the fully hydrolyzed high molecular weight vinyl alcohol copolymer and the low molecular weight, partially hydrolyzed polyvinyl alcohol if any dissolved in water, a surfactant, vinyl acetate and the reducing agent component of the catalyst system. Thereafter the reactor is purged with nitrogen and heated while being pressured with ethylene. The polymerization is initiated by adding the peroxide component of the catalyst system. When the polymerization starts, as indicated by an exotherm, vinyl acetate is added continuously while maintaining the ethylene pressure and adding initiator solution to maintain the reaction temperature. Near the end a further dose of initiator is added to complete the reaction.

Table I summarizes the process conditions for preparing the water resistant copolymers of the present invention.

TABLE I

| Variable | General Range | Preferred Range |
|---|---|---|
| Polymerization, T° C. | 50–90 | 70–85 |
| Pressure, psig | 500–1000 | 850–1000 |
| Catalyst Concentration ($H_2O_2$), % | 0.05–1.0 | 0.1–0.2 |
| Cycle Time, min. | 30–180 | 50–70 |
| Composition, | | |
| % E | 10–30 | 12–20 |
| % VAc | 70–90 | 80–88 |
| % Nonionic Surfactant | 0–1.0 | 0.5 |
| Wt. % PVA Total, based on copolymer | 2.5–6.0 | 3.1–4.0 |
| Vinyl alcohol copolymer, as wt. % of total protective colloid | 20–100 | 30–45 |

The following examples are given for the purpose of illustrating the invention. All parts and percentages are by weight unless otherwise specified.

EXAMPLES 1–11

The following ingredients were charged into a stirred, jacketed, stainless steel, 5-gallon pressure vessel equipped with a stirrer in the amount indicated here or in Table II: a fully hydrolyzed, vinyl alcohol copolymer, medium and/or low viscosity partially hydrolyzed polyvinyl alcohol, dissolved in 5360 grams of water, 260 grams of a 6.1 percent solution of zinc formaldehyde sulfoxylate in water, 50 grams of Triton® X-100 a nonionic surfactant, (except for the control example which did not contain any Triton® X-100 and except for Examples 10 and 11 which instead contained 100 grams of Triton® X-305 (octyl phenoxy polyethoxy ethanol having a higher amount of built in ethylene oxide, manufactured by Rohm and Haas company), and 5800 grams of vinyl acetate. Example 10 in addition contained 25 grams of acrylic acid.

The reactor was closed, purged with nitrogen and the contents were heated to 50° C. while pressuring with ethylene to 650 psig. The polymerization was initiated by starting a feed of a mixture of 35 grams of a 30 percent hydrogen peroxide solution and 1165 grams of water, except for the control example where 70 grams of a 30 percent solution of $H_2O_2$ and 1165 grams of water were added.

When the polymerization started, as indicated by an exotherm, addition of the continuous feed was started, the temperature was levelled out at 80° C. and the ethylene pressure was raised to and maintained at 925 psig. The continuous feed consisted of 2600 grams of vinyl acetate added over a period of 30 minutes at a rate of 94 milliliters per minute and by initiator solution (0.8 percent $H_2O_2$ in water) added to maintain the polymerization temperature of 80° C. while maintaining the ethylene pressure at 925 psig. The reaction exotherm died down after about 3 hours. Thereafter 100 grams of the above initiator solution was further added to the emulsion. The finishing operation consisted of maintaining the emulsion for the indicated time (about 15 to 30 minutes generally) at 80° C. after which the residual vinyl acetate monomer content was generally less than 2.0 percent, based on the weight of the emulsion.

The characteristics of the emulsions produced are indicated in Table II. Water resistance was determined by the Weyerhaeuser soaking under stress test. In this test, wet strength Kraft paper is used to make one-inch overlap joints. The emulsion is drawn down with a No.20RDS wire-wound rod on one sheet of paper, and another sheet is overlaid. The assembly is air dried at ambient temperature for 24 hours. Then one-inch wide strips are cut and immersed in water, at ambient temperature, with a 350-gram weight attached in a shear test. This gives a shearing force of 350 grams per square inch of the lap joint. Quick tack was determined by the Werle Tack Test. In this test an adhesive emulsion is automatically applied by the Werle instrument to a strip of 60 lbs. Kraft paper. Another strip of paper is automatically laminated and, at the same time, delamination of the above two strips is begun. The tack time, expressed to one tenth of a second, is the time required for the emulsion to form a fiber tearing bond. Stability of the dispersions was judged visually by dispersion appearance, i.e., was it of a gritty or smooth texture and whether separate layers were visible after 6-month storage. All the emulsions in Table II had good stability.

methyl methacrylate content of from about 1 to 10 percent by weight, said vinyl alcohol copolymer having a 4% aqueous solution viscosity at 20° C. of from about 5 to about 50 cps.

2. The emulsion of claim 1 containing from about 3.1 to about 4.0 percent, based on the weight of the vinyl acetate-ethylene copolymer, of polyvinyl alcohol, from about 30 to about 45 percent by weight of said polyvinyl alcohol being an at least about 98.0 mole percent hydrolyzed vinyl alcohol copolymer.

3. The emulsion of claim 2 wherein said at least about 98.0 mole percent hydrolyzed vinyl alcohol copolymer has a methyl methacrylate content of from about 1.5 to about 6.0 percent by weight and a 4% aqueous solution viscosity at 20° C. of from about 20 to about 30 cps.

4. The emulsion of claim 1 wherein said vinyl acetate-ethylene copolymer is present in an amount of from about 50 to about 55 percent by weight and has a vinyl acetate content of from about 80 to about 88 percent by weight and an ethylene content of from about 12 to about 20 percent by weight.

5. A process for preparing an aqueous emulsion of vinyl acetate-ethylene copolymer comprising copolymerizing in an aqueous medium from about 70 to about 90 percent by weight of vinyl acetate and from about 10 to about 30 percent by weight of ethylene in the presence of from about 2.5 to about 6.0 percent, based on the weight of the vinyl acetate-ethylene copolymer, of polyvinyl alcohol, at least about 20 percent by weight of said polyvinyl alcohol being an at least 98.0 mole percent hydrolyzed vinyl alcohol copolymer having a methyl methacrylate content of from about 1 to about 10 percent by weight, said vinyl alcohol copolymer having a 4% aqueous solution viscosity at 20° C. of from about 5 to about 50 cps.

6. The process of claim 5 wherein said polyvinyl alcohol is present in an amount of from about 3.1 to about 4.0 percent, based on the weight of the vinyl

TABLE II

| | Polyvinyl Alcohol Charge, g. | | | | Emulsion Characteristics | | | |
| | | | Finish | % | Brookfield Viscosity at | % | Werle Tack | Weyerhaeuser Water Soak |
| Example | 1 | 2 | Time, Min. | Solids | 60 RPM, cps. | Ethylene | sec. | Rating[1] |
|---|---|---|---|---|---|---|---|---|
| Control | A[2], 100 | B[3], 260 | 15 | 54.4 | 1420 | 16.3 | 2.5 | Poor |
| 1 | C[4], 150 | A, 240 | 30 | 57.3 | 2800 | 20.3 | 4.1 | Excellent |
| 2 | C, 38 | B, 351 | 20 | 54.3 | 740 | 14.0 | 6.3 | Very Good |
| 3 | C, 75 | B, 315 | 20 | 53.9 | 960 | 17.0 | 3.8 | Excellent |
| 4 | C, 112 | B, 276 | 20 | 54.6 | 2225 | 19.5 | 3.0 | Excellent |
| 5 | C, 150 | B, 240 | 5 | 55.9 | 3450 | 16.9 | 3.2 | Excellent |
| 6 | C, 150 | B, 240 | 0 | 56.7 | 4250 | 17.4 | 3.3 | Excellent |
| 7 | C, 150 | B, 240 | 15 | 55.5 | 4000 | 17.5 | 3.2 | Excellent |
| 8 | C, 150 | B, 240 | 30 | 55.5 | 1360 | 19.3 | 2.5 | Excellent |
| 9 | D[5], 150 | B, 240 | 30 | 55.6 | 2600 | 18.7 | 2.5 | Excellent |
| 10 | C, 360 | — | 20 | 61.9 | 2950 | 18.1 | 3.4 | At least Good |
| 11 | C, 360 | — | 20 | 54.7 | 1400 | 18.7 | 3.9 | At least Good |

[1]Poor - delaminated in a few hours, Good - passed 24 hours, Very Good - passed over 65 hours, Excellent - passed over 168 hours.
[2]A = 88 mole % hydroxyzed polyvinyl alcohol, 22 cps. 4% aqueous solution viscosity determined at 20° C. by Hoeppler falling ball method.
[3]B = 88 mole % hydrolyzed, 5 cps. viscosity polyvinyl alcohol.
[4]C = 99.5 mole % hydrolyzed, 30 cps. viscosity vinyl alcohol copolymer containing 4% by weight methyl methacrylate.
[5]D = 98 % hydrolyzed, 30 cps. viscosity vinyl alcohol copolymer containing 6% by weight methyl methacrylate.

We claim:

1. An aqueous emulsion consisting essentially of (a) from about 40 to about 60 percent by weight of vinyl acetate-ethylene copolymer having from about 70 to about 90 percent by weight of vinyl acetate and from about 10 to about 30 percent by weight of ethylene, (b) from about 2.5 to about 6.0 percent, based on the weight of the vinyl acetate-ethylene copolymer, of polvinyl alcohol, at least about 20 percent by weight of said polyvinyl alcohol being an at least about 98.0 mole percent hydrolyzed vinyl alcohol copolymer having a acetate-ethylene copolymer, from about 30 to about 45 percent by weight of said polyvinyl alcohol being an at least about 98.0 mole percent hydrolyzed vinyl alcohol copolymer.

7. The process of claim 6 wherein said at least 98.0 mole percent hydrolyzed vinyl alcohol copolymer has a methyl methacrylate content of from about 1.5 to about 6.0 percent by weight and a 4% aqueous solution viscosity at 20° C. of from about 20 to about 30 cps.

* * * * *